United States Patent [19]
Schneider

[11] 3,884,309
[45] May 20, 1975

[54] BIDIRECTIONAL DRILL TRANSPORT

[76] Inventor: Emanuel Schneider, 104 Eighth St., Wakeeney, Kans. 67672

[22] Filed: Nov. 23, 1973

[21] Appl. No.: 418,450

[52] U.S. Cl. ............... 172/240; 172/310; 172/427; 172/776; 111/85
[51] Int. Cl. .................... A01b 63/16; A01b 73/00
[58] Field of Search .......... 172/240, 310, 313, 395, 172/421, 427, 776; 280/43.2, 414.5; 111/85

[56] References Cited
UNITED STATES PATENTS

| | | | |
|---|---|---|---|
| 2,536,405 | 1/1951 | Whittier | 172/421 X |
| 2,749,137 | 6/1956 | Thomsen et al. | 280/43.2 |
| 3,240,005 | 3/1966 | Rowse | 172/310 X |
| 3,245,695 | 4/1966 | Bernard | 280/43.2 X |
| 3,402,938 | 9/1968 | McCallum | 172/240 X |
| 3,532,173 | 10/1970 | Johnson et al. | 172/313 X |
| 3,610,661 | 10/1971 | Pierce et al. | 172/240 X |
| 3,705,560 | 12/1972 | Lappin | 172/310 X |

Primary Examiner—Edgar S. Burr
Assistant Examiner—Paul T. Sewell
Attorney, Agent, or Firm—D. A. N. Chase

[57] ABSTRACT

A bidirectional transport is disclosed which facilitates the movement of agricultural equipment from place to place, particularly grain drills having press wheels which are subject to excessive wear during transit. The transport includes a carrier frame which is releasably attached to the frame of the drill adjacent the press wheels, and a pair of ground wheels beneath the carrier frame which may be selectively positioned to permit movement of the drill in either of two orientations. The support for each ground wheel is an upright, tubular member of square cross-sectional configuration telescoped within a housing on the carrier frame that contains a jack screw for extending and retracting the wheel support member to, in turn, raise and lower the carrier frame. By fully extending the wheel support members until they are no longer engaged within their housings, they may be rotated 90° and reinserted to provide two fixed positions corresponding to two different directions of movement of the drill. Accordingly, with the press wheels maintained out of engagement with the ground, the drill may be transported in its usual, operational orientation, or moved over the ground at right angles to the normal direction to minimize the width of the equipment (as would be required in road or highway movement).

4 Claims, 6 Drawing Figures

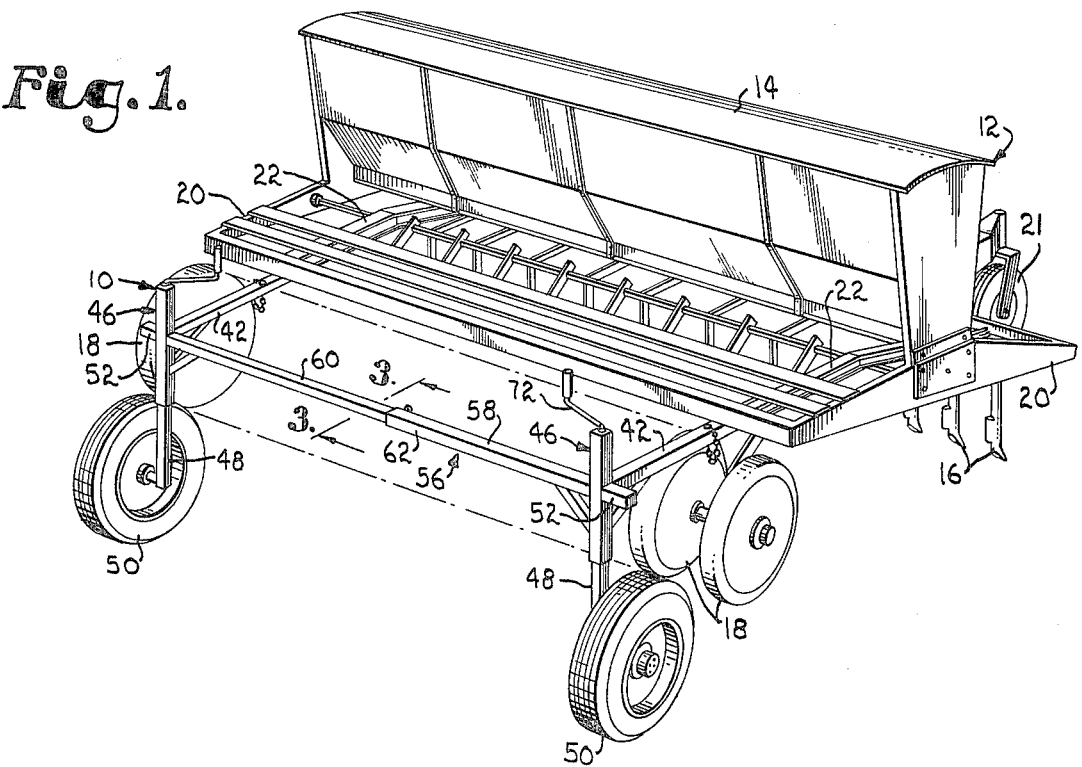
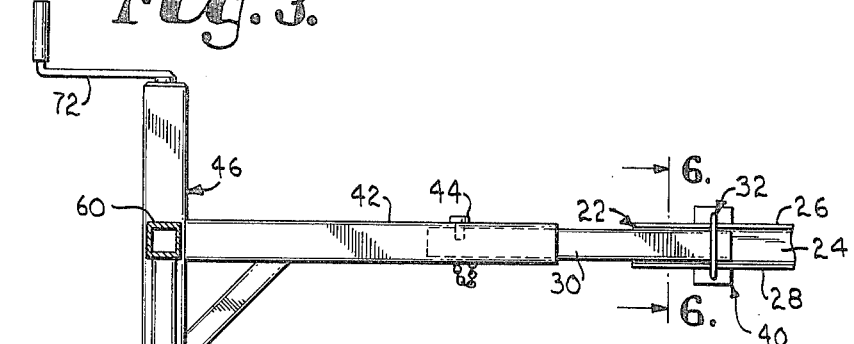
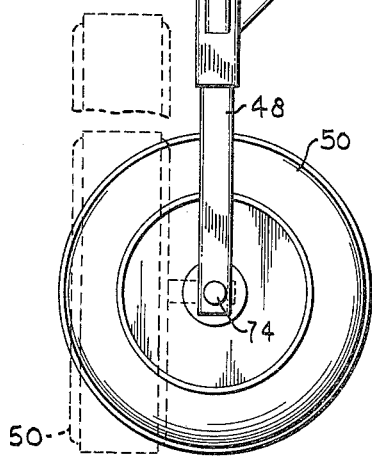
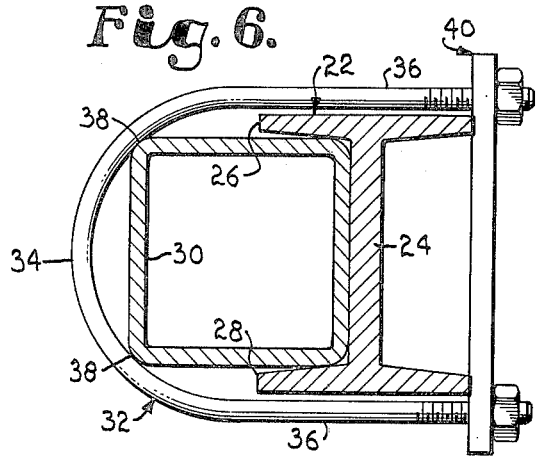

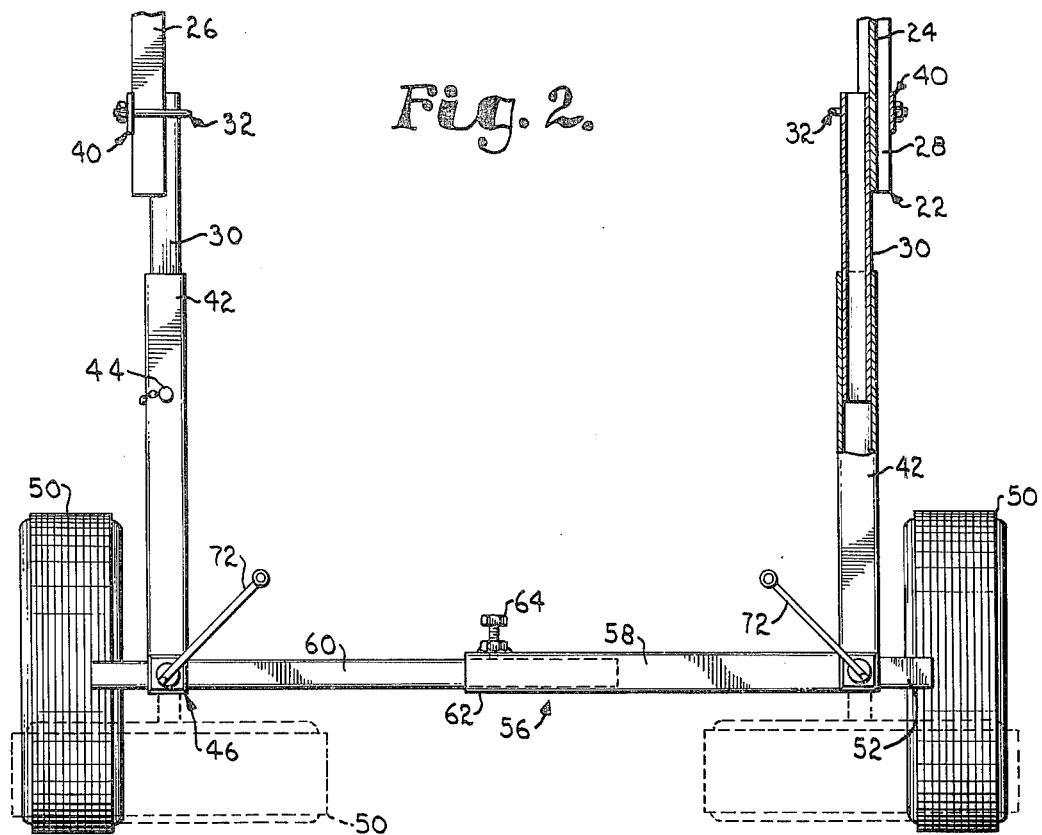
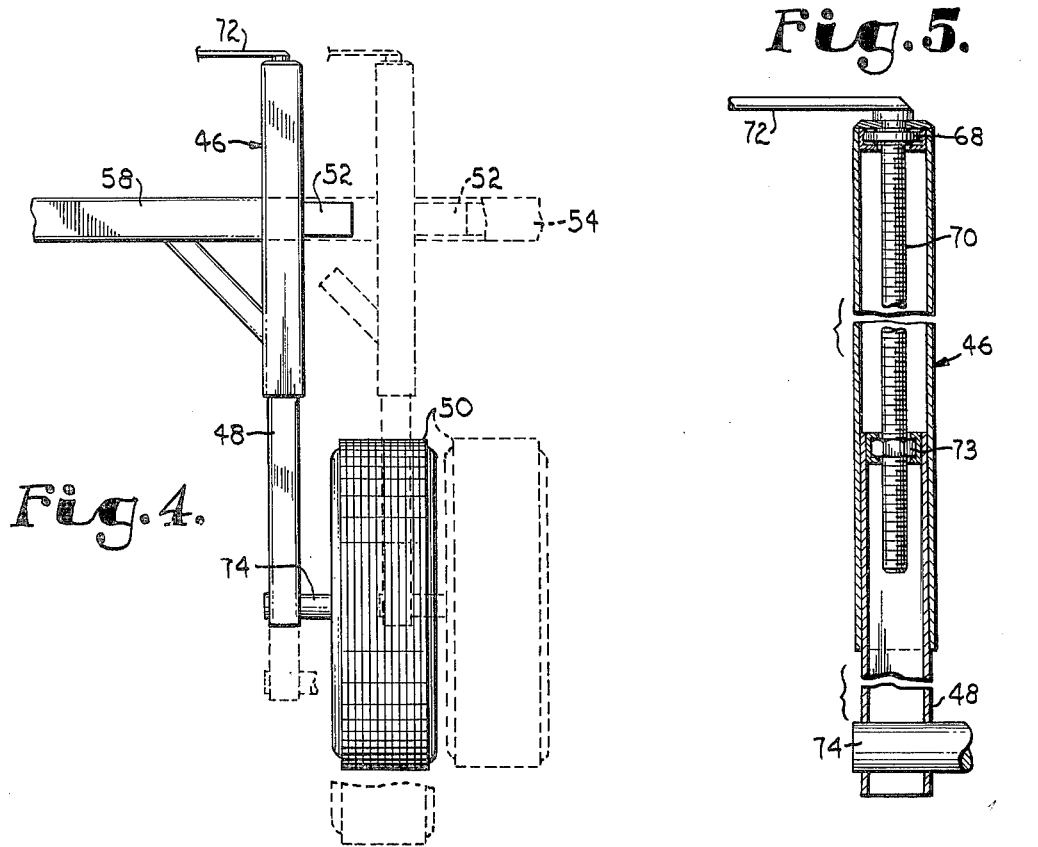

BIDIRECTIONAL DRILL TRANSPORT

This invention relates to an improved means of transporting agricultural equipment, such as grain drills and the like which have ground engaging working components that should be elevated above ground level during transit.

Grain drills and similar agricultural equipment present special problems to the farmer when it is necessary to move the equipment from field to field or back and forth from a storage area. A typical grain drill or seed drill is of elongated configuration transversely of its normal path of travel during operation, and has a series of shovels or hoes which open the soil and inject the seeds. A like number of press wheels immediately behind the shovels close the soil over the seeds.

The press wheels of equipment of this type are not designed for over-the-road use. Consequently, they are subjected to excessive wear when the equipment must be transported from place to place. Heretofore, transports have been provided for grain drills in order to alleviate the problem, but these devices have presented a number of disadvantages.

First of all, the problem of transporting a grain drill from field to field is different from the problem presented in over-the-road transit. As is common with many types of agricultural equipment, the structure is elongated at right angles to the normal direction of movement over the field, i.e., the narrow dimension of the structure is front-to-rear rather than side-to-side for wide coverage in each pass during use. Therefore, in open country a grain drill may be pulled broadside from field to field, but for over-the-road transit it must be drawn at a right angle to its normal direction of movement.

The difficulty discussed above with respect to over-the-road transit becomes especially acute when multiple units are involved. These are ganged to provide a broadside array for use in the field, but must be transported in an in-line fashion except during movement from field to field in open country. Present transport designs either provide for in-line movement exclusively or for broadside movement exclusively, without providing the operator with an option as to orientation. Transporting either a single unit or multiple units in the in-line orientation is to be avoided if possible, since the tractor must be unhitched, connected to one end of the assembly, and then rehitched for normal operation. However, as mentioned above, the capability of in-line transit must be provided due to instances where over-the-road movement is unavoidable.

It is, therefore, the primary object of the present invention to provide a bidirectional transport for agricultural equipment which possesses the desired flexibility discussed above in order that the equipment may be transported in a selected orientation and direction at the option of the operator.

Another important object of the invention is to provide a bidirectional transport for seed drills and the like that will readily elevate the press wheels or other ground engaging components to facilitate the moving of the equipment over various ground surfaces in either of two selectable orientations.

Still another important object of this invention is to provide a bidirectional transport as aforesaid that, once installed, will not interfere with the equipment while it is operational, but which may be quickly deployed with a minimum of time and effort on the part of the operator for either over-the-road travel or movement from field to field.

Furthermore, another important object of the invention is to provide a bidirectional transport as aforesaid that may be readily installed and is adaptable to various types of agricultural and field equipment which, due to their dimensional characteristics, may need to be transported from place to place in either of two orientations depending upon terrain and roadway considerations, the presence or absence of obstacles such as field gates, etc., and the distance over which the equipment is to be transported.

In the drawings:

FIG. 1 is a rear perspective view of a grain drill showing the transport in place thereon;

FIG. 2 is an enlarged, top plan view of the transport and certain components of the drill frame to which it is attached (other portions of the drill being removed for clarity), and illustrates the 90° adjustability of the wheels in broken lines;

FIG. 3 is a vertical sectional view of the transport taken along line 3—3 of FIG. 1, on the same scale as FIG. 2;

FIG. 4 is a fragmentary, elevational view of the wheel and associated structure at one corner of the carrier frame of the transport and illustrates the adjustability of the frame and the variable elevation (jacking) of the wheel;

FIG. 5 is a further enlarged, fragmentary, longitudinal cross-section of the telescoping tubular members forming one of the wheel supports and its associated housing, the internal jack screw being revealed in elevation; and FIG. 6 is a greatly enlarged, cross-sectional view taken along line 6—6 of FIG. 3.

Referring to the drawings, particularly FIG. 1, the transport 10 of the present invention is shown installed on a grain drill 12 having an elongated seed hopper 14 beneath which a series of spaced planting hoes or shovels 16 are disposed. A series of press wheels 18 are suspended from the drill frame 20 and are mounted behind the shovels 16 with each press wheel 18 being in alignment with a corresponding shovel 16 in relation to the normal, forward direction of movement of the drill 12. A front caster wheel 21 is mounted on a forward extension of the frame 20, and a pair of I-beams 22 adjacent the respective ends of the drill comprise major structural components of the frame 20 and extend rearwardly from the hopper 14 above the ends of the series of press wheels 18.

Each of the two I-beams 22, as best shown in FIG. 6, has a central web 24 and a pair of outwardly extending, upper and lower flanges 26 and 28. The inside, U-shaped recess formed by the web 24 and the flanges 26 and 28 presents a channel which receives a mounting member 30 of the detachable transport frame. Each member 30 consists of a length of square tubing stock and is attached to the corresponding I-beam 22 by a U-bolt 32. The U-bolt 32 has an arcuate bight portion 34 and a pair of parallel, threaded shanks 36. The arcuate portion 34 engages the outer edges 38 of the tubular member 30 and the shanks 36 are received by a plate 40 held thereon by a pair of nuts. Accordingly, the two members 30 are thereby permanently clamped to the two beams 22 to present two rearwardly extending mounts.

A pair of horizontal outrigger frame elements 42 of square, tubular construction are telescoped over the outwardly extending ends of the corresponding mounting members 30 as is clear in FIG. 3. It should be noted that each member 30 and the outrigger element 42 telescoped thereon have aligned holes adapted to receive a releasable fastener 44, such as a pin that may be retained on the member 30 by a small chain to prevent loss when the transport 10 is detached.

The outboard end of each of the horizontal frame elements 42 is welded to an upright wheel support housing 46 which receives a lower, vertically reciprocable member 48 that serves as a support for a ground wheel 50. A coupling stub 52 projects laterally from each housing 46 and, as shown in FIG. 4, is adapted to receive a telescoping coupling member 54 (shown in broken lines) employed for the purpose of interconnecting adjacent transports 10 when two or more are used on multiple unit drills.

The wheel support housings 46 are spanned by a horizontal, longitudinally extending main frame member 56 disposed at a right angle to the outrigger frame elements 42. As best shown in FIG. 2, the main frame member 56 comprises a pair of adjustable, telescoping tubular segments 58 and 60. The inner end 62 of the frame segment 58 is provided with a set screw 64. The two frame segments 58 and 60 may be relatively telescoped to accommodate various sizes of field equipment, as illustrated in broken lines in FIG. 4. Once the carrier frame of the transport 10 is adjusted to the proper width, it is attached to the mounting members 30 and the set screw 64 is tightened.

Referring now to FIG. 5, one of the upright wheel support housings 46 and the associated telescoping wheel support 48 are shown in detail. The housing 46 consists of a tubular member of square cross-section, and has a thrust bearing 68 mounted within its upper end. The bearing 68 receives a jack screw 70 coaxial with the housing 46 and member 48. A horizontally extending crank arm 72 is provided on the upper end of the screw 70, and a nut 73 threadably receives the lower portion thereof. The nut 73 is retained within the upper end of the lower, telescoping wheel support member 48. The support member 48 is of square tubular construction similar to the housing 46, but is of a smaller transverse dimension so as to allow it to be slidably received within the housing walls for selective reciprocation in response to rotation of the jack screw 70. When the crank arm 72 is operated, the screw 70 rotates, moving the nut 73 and therewith the support member 48 and the wheel 50 in a vertical direction (up or down) within the housing 46. Upon extending the support member 48 in this manner, the transport 10 and hence the drill frame 20 are thereby raised.

It should be noted that each of the wheels 50 is mounted on a fixed axle 74 carried by the lower end of the associated support member 48. Therefore, the axis of rotation of each wheel 50 is fixed by the support member 48, but may be selectively varied as illustrated in FIGS. 2 and 3 by shifting the member 48 between two positions differing by an angle of 90°.

OPERATION

Installation of the transport 10 is facilitated by rotating the crank arms 72 until the elevation of the outrigger frame elements 42 coincides with the mounting members 30 that are permanently secured to the I-beams 22 of the drill frame 20. Once the two elements 42 are telescoped on to the members 30 and fixed in place by the fasteners 44, the ground wheels 50 may be further lowered relative to the transport and drill frames to raise the press wheels 18 clear of the ground surface. Assuming that the wheels 50 are positioned as illustrated in FIG. 1 and in full lines in FIGS. 2–4, the grain drill 10 may be transported in the usual manner in its normal direction of movement as in operation, but with the press wheels 18 raised sufficiently to prevent engagement with the ground.

The orientation of the drill 12 just discussed is advantageous where space permits, such as in moving the equipment from field to field. However, this may be unsatisfactory for over-the-road transit due to clearance problems, and even in field movement in some instances. Accordingly, to change to an in-line orientation, the cranks 72 are operated to completely extend the wheel support members 48 until they clear the housings 46. As may be appreciated from viewing FIG. 5, the nut 73 will ultimately be run off of the lower end of the jack screw 70, permitting the member 48 to be completely withdrawn from the housing 46.

Although the wheel supports 48 may be fully extended and released while the transport 10 is installed by taking advantage of depressions in the ground or a small ridge upon which the press wheels 18 may rest, this would normally be accomplished prior to installation. Once the support members 48 are free, they are simply reinserted in their housings 46 after being turned 90° with respect to the position illustrated in full lines. Upon reinsertion, each support member 48 is held against rotation about the common axis of the tubular members 46 and 48 due to the square cross-sectional configuration of both and the interengaged corner shoulders thus presented. Reverse rotation of each crank 72 rethreads the nut 73 on the screw 70 to retract the support member 48 upwardly within its housing 46 to dispose the carrier frame at the desired elevation.

With the ground wheels 50 in the positions illustrated in broken lines, the drill 12 is now moved at right angles to its normal direction of travel through the use of a suitable hitch (such as an A-frame drawbar, not shown) which may be connected to the drill frame 20 at either end of the unit. When two or more drills 12 are ganged together, the coupling stubs 52 on the carrier frames may be used to interconnect the several transports 10 for added stabilization, if desired. With the ground wheels 50 of such transports all in the position illustrated in broken lines, it may be appreciated that the entire multi-unit assembly may be moved in an in-line fashion when necessary due to clearance considerations.

Having thus described my invention, what is claimed as new and desired to be secured by Letters Patent is:

1. A bidirectional transport for agricultural equipment comprising:
   a carrier frame adapted to be connected to said equipment;
   a wheel adapted to run in engagement with the ground;
   an upright wheel support mounting said wheel for rotation about a fixed axis; and
   selectively operable structure on said frame securing said wheel support thereto in either of a pair of fixed positions corresponding to two different directions of movement of the equipment extending front to rear and transversely of the equipment respectively, said axis of the wheel when said support is in one of said positions being at an angle of approximately 90° relative to the location of the axis when said support is in the other of said positions, said structure and said support presenting upper and lower, mating coaxial members having an upright common axis, said members being of polygonal configuration transversely of said common axis to present interengaging corner shoulders preventing relative rotation thereof about said common axis, said structure including jacking means coupled with said lower member presented by the wheel support for raising and lowering said carrier frame relative to said wheel and for extending said lower member to a disposition clearing said upper member to permit remating thereof in either of said positions.

2. The transport as claimed in claim 1, wherein said jacking means includes an upright, rotatable screw extending within said upper member and defining said common axis of the members, means carried by said lower member threadably receiving said screw, and a crank connected with said screw for rotating the latter to extend and retract said lower member relative to said upper member.

3. The transport as claimed in claim 1, wherein said equipment is a seeding device provided with a series of press wheels and a frame having components adjacent the press wheels, and wherein said carrier frame includes a pair of mounting members adapted to be fixed to said components, a pair of generally horizontally extending outrigger elements relatively telescoped with corresponding mounting members, and fastener means releasably securing said elements to said mounting members to permit detachment of the transport from the device.

4. In combination:

seeding equipment provided with a series of press wheels and a frame having components adjacent said press wheels;

a carrier frame secured to said components;

a carrier wheel adapted to run in engagement with the ground;

an upright wheel support mounting said carrier wheel for rotation about a fixed axis; and selectively operable structure on said carrier frame securing said wheel support thereto in either a first fixed position where the axis of said carrier wheel is generally orthogonal to the normal direction of movement of said equipment, or a second fixed position where the axis thereof is generally parallel to said normal direction of movement, said structure including jacking means coupled with said wheel support for raising and lowering said carrier frame, and hence said frame components, relative to said carrier wheel whereby, upon engagement of the wheel with the ground and elevation of the carrier frame, the equipment may be transported with the wheel support in the selected position and with the press wheels out of contact with the ground, said structure and said wheel support presenting upper and lower, mating coaxial members respectively having an upright common axis, said members being of polygonal configuration transversely of said common axis to present interengaging corner shoulders preventing relative rotation thereof about said common axis, said jacking means being operable to extend said lower member to a disposition clearing said upper member to permit remating thereof in either of said positions.

* * * * *